Patented Mar. 16, 1937

2,073,854

UNITED STATES PATENT OFFICE 2,073,854

PROCESS OF TREATING FRUITS AND VEGETABLES

Jagan N. Sharma, Berkeley, Calif., assignor to Food Machinery Corporation, San Jose, Calif., a corporation of Delaware No Drawing. Application April 10, 1934, Serial No. 719,858

8 Claims. (Cl. 99—103)

This invention relates to improvements in methods of removing spray residues from fruits and vegeables by means of a treating agent particularly adapted for use in such process. During cultivation of deciduous fruits, garden vegetables, etc., it is often necessary to apply insecticidal, fungicidal and parasiticidal sprays and/or dusts, these sprays or dusts often containing lead, arsenic, copper and other toxic substances. Numerous plants and fruits exude wax during their growth, which wax tenaciously retains the toxic substances applied thereto in the form of sprays, dusts, and the like. This is particularly true of the deciduous fruits such as apples.

The problem of removing the spray residues from the fruits and vegetables prior to consumption is a troublesome one. Numerous sprays contain mineral oils which adhere to the surface of the fruit and make it almost impossible to remove the spray residue from the fruit by waterwashing. The use of hydrochloric acid solutions has been found unsatisfactory. The use of sodium silicate solutions has been described in my previous Patent No. 1,875,944, and although sodium silicate solutions are easy to apply, it has been found that temperatures of about 120° F. are advisable in order to satisfactorily remove the residues. Such high temperatures are detrimental. Lower temperatures require materially longer periods of contact and such long periods of contact are detrimental to the fruit.

I have discovered that the various spray residues can be removed from fruits and vegetables in a rapid and economical manner by the use of aqueous solutions of an alkali silicate such as sodium or potassium silicate when such solutions contain a soap containing alkali salts of fatty acids of greater molecular weight than oleic acid in major proportion.

The invention also relates to a treating agent or product in concentrated form, capable of being dissolved in water so as to give rise to a suitable treating solution.

An object of the invention, therefore, is to disclose and provide a method of removing spray residues from various fruits and vegetables in a rapid and economical manner without the necessity of prolonged contact with a treating solution nor the use of high treating temperatures.

Another object is to disclose and provide a treating agent particularly well adapted for the removal of spray residues from deciduous fruits, vegetables and the like.

In the treatment of fruits and vegetables for the removal of spray residues, it has been found desirable to subject the fruit to a bath of treating solution, large volumes of treating solution being repeatedly passed over the fruit for the purpose of washing the same and carrying away the spray residues carried by the exterior surfaces.

I have discovered that the use of water-soluble soaps of certain fatty acids in conjunction with the soluble alkali silicates, materially expedites the removal of spray residues. Ordinarily vegetable soaps, such as cocoanut oil soaps, are not suitable as the treating or washing solution gives rise to an extremely voluminous and stable foam. This foam impairs the effectiveness of the silicate solution. When, however, a soap is used which soap contains alkali salts of fatty acids of greater molecular weight than oleic in major proportion, then the effectiveness of the treating solution is enhanced. The preferred soap should contain not less than about 70%–75% of soaps of the acids of higher molecular weight than oleic. Tallow soaps or soaps containing stearic acid, or other higher acids are illustrative of those found suitable.

These soaps may be present in the final treating solution in but minor quantities, for example, 0.001% to about 0.01% by weight. In these quantities, the sodium silicate solution appears to more thoroughly wet the exterior surfaces of the materials being treated and as a result, the removal of arsenical, lead and other spray residues is much more thorough.

Moreover, the use of temperatures as high as 120° F. is not necessary. Temperatures of 105° F.–110° F. are entirely satisfactory for rapid commercial operation. If higher temperatures are used time of contact could be reduced proportionately.

I have also observed that the tallow soaps or soaps of the fatty acids of high molecular weight even when present in the minor proportions indicated, materially reduce the surface tension of the treating solution, thereby facilitating the wetting action of the solution upon the fruits and vegetables, particularly when the fruits are provided with water-repellent surfaces. The surface tension of a solution containing 9.65% sodium silicate is 75.15 dynes per centimeter at 20° C. By raising the temperature to 38° C., the surface tension is but slightly reduced. When the same sodium silicate solution contains 0.005% of a tallow soap, however, the surface tension is reduced to about 67 dynes. Larger quantities of soap further materially reduce the surface tension.

The treating solution is preferably made from sodium silicate containing about 1.5–2.2 parts SiO$_2$ per part of Na$_2$O. The treating solution may contain from about 2% to 10% of 55° Bé. silicate.

A product particularly adapted for use in the preparation of treating solutions may be prepared by intimately mixing tallow or fatty acids containing the higher molecular weight acids in major proportion, with a sodium silicate having a relatively low silica content and a high alkali content, and heating the mixture with accompanying agitation for a sufficient length of time to cause saponification of the fatty acids. In this manner, a rather viscous mass can be obtained which will not separate and which contains the soap and the silicate in a homogeneous and intimate dispersion. This product may then be added to the water so as to form the desired treating solution with the greatest of ease.

In the event deciduous fruits are being treated and mineral oil sprays had been used during cultivation and growth of the fruit, some petroleum distillate may be advantageously incorporated in the treating solution. Petroleum distillates such as kerosene, are suitable and should not be present in amounts in excess of about 5% to 10%. The quantity of soap present should be increased whenever the treating solution contains petroleum distillate dispersed therein. The petroleum distillate appears to exert a solvent effect upon the oily residues, facilitating their removal.

I claim:

1. A process of washing fruits and vegetables for the removal of spray residues therefrom, comprising contacting fruit with an aqueous solution containing a soluble alkali silicate, and a water-soluble soap of fatty acids of molecular weight greater than that of oleic acid.

2. A process of washing fruits and vegetables for the removal of spray residues therefrom, comprising contacting fruit with an aqueous solution containing a soluble alkali silicate, and a water-soluble soap containing not less than 70% of alkali salts of fatty acids of greater molecular weight than oleic.

3. A process of washing fruits and vegetables for the removal of spray residues therefrom, comprising contacting fruit with an aqueous solution containing a soluble alkali silicate, and a water-soluble soap containing alkali salts of fatty acids of greater molecular weight than oleic in major proportion.

4. A process of washing fruits and vegetables for the removal of spray residues therefrom, comprising contacting fruit with an aqueous solution containing a soluble alkali silicate, and a tallow soap.

5. A process of washing fruits and vegetables for the removal of spray residues therefrom, comprising contacting fruit with an aqueous emulsion containing petroleum distillate dispersed in an aqueous solution of soluble alkali silicate and soap, said soap containing alkali salts of fatty acids of greater molecular weight than oleic in major proportion.

6. A process of washing fruits and vegetables for the removal of spray residues therefrom, comprising contacting fruit with an aqueous solution containing from 2% to 10% of soluble alkali silicate, and a soap containing not less than 70% of alkali salts of fatty acids of greater molecular weight than oleic.

7. A process of washing fruits and vegetables for the removal of spray residues therefrom, comprising contacting fruit with an aqueous solution containing from 2% to 10% of soluble alkali silicate and less than about 2% by weight of a soap containing alkali salts of fatty acids of greater molecular weight than oleic in major proportion.

8. A process of washing fruits and vegetables for the removal of spray residues therefrom, comprising contacting fruit with an aqueous solution containing from 2% to 10% of soluble alkali silicate, a soap containing alkali salts of fatty acids of greater molecular weight than oleic in major proportion, and not more than 10% of petroleum distillate dispersed therein.

JAGAN N. SHARMA.